United States Patent

Feldhues et al.

Patent Number: 5,225,109
Date of Patent: * Jul. 6, 1993

[54] ELECTRICALLY CONDUCTING POLYMERS AND THEIR PREPARATION

[75] Inventors: Michael Feldhues, Bad Soden am Taunus; Günther Kämpf, Oestrich-Winkel, both of Fed. Rep. of Germany

[73] Assignee: Hoechst AG, Frankfurt am Main, Fed. Rep. of Germany

[*] Notice: The portion of the term of this patent subsequent to May 25, 2010 has been disclaimed.

[21] Appl. No.: 308,882

[22] Filed: Feb. 9, 1989

[30] Foreign Application Priority Data

Feb. 13, 1988 [DE] Fed. Rep. of Germany ....... 3804520

[51] Int. Cl.$^5$ .............................................. H01B 1/00
[52] U.S. Cl. .................................. 252/500; 526/256; 526/258
[58] Field of Search ................. 252/500; 526/256, 258

[56] References Cited

U.S. PATENT DOCUMENTS

| | | | |
|---|---|---|---|
| 4,599,194 | 7/1986 | Frommer et al. | 252/500 |
| 4,711,742 | 12/1987 | Jen et al. | 252/500 |
| 4,900,782 | 2/1990 | Han et al. | 525/398 |

OTHER PUBLICATIONS

R. L. Elsenbaumer et al., *Synth. Metals* 15, 169–174 (1986).
J. Bargon et al, *IBM J. Res. Develop.* 27, 330–341 (1983).
J. Roncali et al, *J. Phys. Chem.* 91, 6706–6714 (1987).

*Primary Examiner*—Mark L. Bell
*Assistant Examiner*—Deborah Jones
*Attorney, Agent, or Firm*—Connolly and Hutz

[57] ABSTRACT

The invention relates to electrically conducting polymers which are obtainable as self-supporting films or composite bodies and which contain structural units which are derived from at least one monomer of the formula (I)

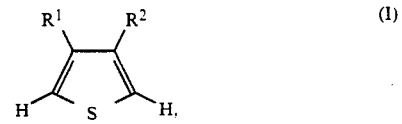

wherein $R^1$ represents a $C_1$–$C_{12}$-alkoxy group and $R^2$ represents a $C_1$–$C_{12}$-alkyl group. The invention furthermore relates to a process for preparing said polymers by oxidative polymerization of at least one monomer of said formula (I). The polymers according to the invention may be used, in particular, for applications for which high chemical, mechanical or thermal stability simultaneously accompanied by high electrical conductivity is necessary and of advantage.

8 Claims, No Drawings

ELECTRICALLY CONDUCTING POLYMERS AND THEIR PREPARATION

DESCRIPTION

The invention relates to electrically conducting polymers which are available as self-supporting films or composite bodies, and a process for their preparation.

It is known that heteroaromatics can be polymerized oxidatively, for example by anodic oxidation, and in doing so form electrically conducting polymers which are of interest for electronic engineering in semiconductor components, switches, screening materials, solar cells and as electrode materials in electrochemical synthesis and in reversible charge stores (cf., for example, IBM J. Res. Develop. 27, 330 (1983)).

A great disadvantage of most electrically conducting polymers hitherto known is that they are formed as brittle films or powders during the preparation and cannot be converted to a form suitable for an application as a consequence of their insolubility and lack of thermoplasticity.

An exception is formed by polypyrrole and also some poly(3-alkylthiophenes) which, under suitable preparation conditions, can be obtained in the form of a continuous film if quite particular anions are incorporated (cf. J. Phys. Chem. 1987, 6706) but which have an inadequate chemical and also thermal stability or insufficient long-term stability of the electrical conductivity, in particular, in the presence of moisture (cf. Synthetic Metals 15, 169 (1986)).

The object of the present invention was therefore to provide an electrically conducting polymer which can be prepared in a simple manner in the form of a self-supporting film or as a self-supporting composite body, has a high electrical conductivity and also a high chemical stability and a high thermal stability.

The invention therefore relates to an intrinsically electrically conducting polymer in the neutral (non-conducting) and oxidized (doped) form composed of structural units which are joined to each other by linking in position 2 and/or position 5 and comprising, on the statistical average, 60 to 100 mol-% of structural units which are derived from at least one monomer of the formula (I)

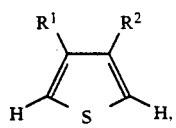

wherein

R$^1$ represents a straight-chain or branched C$_1$-C$_{12}$-alkoxy group or —O(CH$_2$CH$_2$O)$_n$CH$_3$ where n=1 to 4 and R$^2$ represents a C$_1$-C$_{12}$-alkyl group or R$^1$ and R$^2$ together form the radical —O(CH$_2$)$_m$CH$_2$ where m=1 to 12, 0 to 40 mol-% of structural units which are derived from at least one monomer of the formula (II)

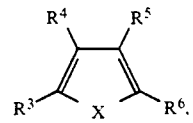

wherein

R$^4$ and R$^5$ denote, independently of each other, a hydrogen atom, a halogen atom, a C$_1$-C$_{12}$-alkyl group, arylmethyl or aryl or form an aromatic ring together with the carbon atoms which join them, R$^3$ and R$^6$ denote, independently of each other, a hydrogen atom or R$^3$ together with R$^4$ and the carbon atoms which join them or R$^5$ together with R$^6$ and the carbon atoms which join them in each case form an aromatic ring, X denotes an oxygen atom, a sulfur atom, an NH group, an N-alkyl group or an N-aryl group, 0 to 40 mol-% of structural units which are derived from at least one monomer of the formula (III)

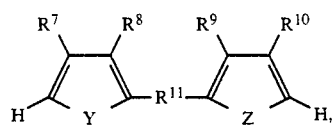

wherein

R$^7$, R$^8$, R$^9$ and R$^{10}$ denote, independently of each other, a hydrogen atom, a C$_1$-C$_{12}$-alkyl group, an aryl group or a C$_1$-C$_{12}$-alkoxy group, Y and Z denote, independently of each other, an oxygen atom, a sulfur atom, an NH group, an N-alkyl group or N-aryl group, R$^{11}$ denotes an arylene group, a heteroarylene group or a conjugated system of the formula (—CH=CH—)$_p$, wherein p is zero, 1, 2 or 3.

The invention furthermore relates to a process for preparing the intrinsically electrically conducting polymer by oxidative chemical or electrochemical polymerization of at least one monomer of the formula (I) optionally together with one or more comonomers of the formulae (II) and (III), at a grid, fabric or felt anode composed of noble-metal or carbon fibers.

The polymers according to the invention contain structural units which are derived from at least one monomer of the formula (I)

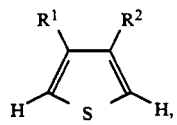

by linking in position 2 and/or position 5, R$^1$ being a straight-chain or branched C$_1$-C$_{12}$-, preferably C$_1$-C$_4$- and, in particular, C$_1$-C$_2$-alkoxy group or —O(CH$_2$CH$_2$O)$_n$CH$_3$, where n=1 to 4, preferably 1.

R$^2$ is a C$_1$-C$_{12}$-, preferably C$_1$-C$_4$-alkyl group and, in particular, methyl group or a C$_1$-C$_4$-, preferably C$_1$-C$_2$-alkoxy group.

R$^1$ and R$^2$ may also form together the radical —O(CH$_2$)$_m$CH$_2$, where m=1 to 12, preferably 1 or 2.

Examples of representatives of the formula (I) are 3-methoxy-4-methylthiophene, 3-ethoxy-4-methylthiophene, 3-butoxy-4-methylthiophene, 3-dodecyloxy-4-methylthiophene, 3-(methoxyethoxy)-4-methylthiophene, 3-(methoxyethoxyethoxy)-4-methylthiophene, 3-ethyl-4-methoxythiophene, 3-butyl-4-methoxythiophene, 3-dodecyl-4-methoxythiophene, 3-ethoxy-4-ethylthiophene, 3-butoxy-4-ethylthiophene, 3,4-(prop-3-ylene-1-oxy)thiophene. Mixtures of the monomers (I) may also be used.

The quantity of the structural units which are derived in the polymers according to the invention from at least one monomer of the formula (I) is, on the statistical average, 60 to 100 mol-%, preferably 90 to 100 mol-% and, in particular, 95 to 100 mol-%, based on the structural units present in the undoped polymer.

The monomers of the formulae (II) and (III) are preferably suitable as comonomers for the monomers of the formula (I).

For example, mention may be made here of compounds of the formula (II)

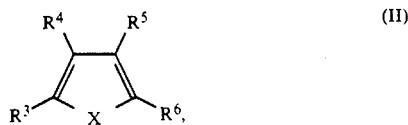

(II)

$R^4$ and $R^5$ are, independently of each other, a hydrogen atom, a halogen atom, a $C_1$–$C_{12}$-, preferably $C_1$–$C_4$-alkyl group, an arylmethyl group, preferably benzyl or thienylmethyl, an aryl group, preferably phenyl or thienyl, or form, together with the carbon atoms which join them, an aromatic ring, preferably a benzene, thiophene or pyrrole ring.

$R^3$ and $R^6$ are, independently of each other, a hydrogen atom or in each case form an aromatic ring, preferably a benzene, thiophene or pyrrole ring, with $R^4$ or $R^5$ together with the carbon atoms which join them.

X denotes an oxygen atom, a sulfur atom, an NH-group, an N-alkyl group, preferably N-$C_1$–$C_4$-alkyl, or an N-aryl group, preferably N-phenyl.

Pyrrole, 3-chloropyrrole, 3-methylpyrrole, 3,4-dimethylpyrrole, N-methylpyrrole, thieno[3,2-b]pyrrole, carbazol, thiophene, 3-methylthiophene, 3-ethylthiophene, 3-butylthiophene, 3-octylthiophene, 3,4-dimethylthiophene, 3,4-diethylthiophene, thieno[2,3-b]thiophene, dithieno[3,2-b;2′, 3′-d]thiophene, dibenzothiophene and isothianaphthene are suitable.

Furthermore, suitable comonomers for monomers of the formula (II) are those of the formula (III).

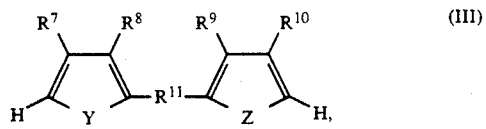

(III)

$R^7$, $R^8$, $R^9$ and $R^{10}$ are, independently of each other, a hydrogen atom, a $C_1$–$C_{12}$-, preferably $C_1$–$C_4$-alkyl group, an aryl group, preferably phenyl or thienyl or a $C_1$–$C_{12}$-, preferably $C_1$–$C_4$-alkoxy group.

Y and Z denote an oxygen atom, a sulfur atom, an NH group, an N-alkyl group, preferably N-$C_1$–$C_4$-alkyl, or an N-aryl group, preferably N-phenyl.

$R^{11}$ stands for arylene, preferably phenylene, heteroarylene, preferably thienylene, furanylene, pyrrolylene or a system of the formula (—CH=CH—)$_p$, where p=zero, 1, 2 or 3.

In particular, 1,2-di(2-thienyl)ethene, 1,2-di(3-methylthien-2-yl)ethene, 1,2-di(2-furanyl)ethene, 1-(2-furanyl)2-(2-thienyl)ethene, 1,4-di(2-thienyl)-buta-1,3-diene, 1,4-di(2-thienyl)benzene, 2,5-di(2-thienyl)thiophene (terthienyl), 2,5-di(2-thienyl)pyrrole, 2,2′-dithiophene, b 3,3′-dimethyl-2,2′-bithiophene, 3,3′-dimethoxy-2,2′-bithiophene, 3,4′-dimethoxy-2,2′-bithiophene and 4,4′-dimethoxy-2,2′-bithiophene are suitable.

The quantity of the structural units which are derived from monomers of the formula (II) is, on the statistical average, 0 to 40 mol-%, preferably 0 to 10 mol-%. The structural units derived from monomers of formula (III) are, on the statistical average, present in an amount of 0 to 40 mol-%, preferably 0 to 10 mol-%.

The above comonomers of the formulae (II) and (III) may also be used in mixtures with each other.

The preparation of the monomers of the formula (I) and of the comonomers of the formulae (II) and (III) is known from the prior art or is described in the German patent application P 3,804,522.2.

In the oxidized form, the electrically conducting polymers according to the invention contain a suitable number of anions to compensate for the positive charges. These are preferably the anions of the conducting salt or of the oxidizing agent which was used in the preparation process. As examples of suitable anions, mention may be made here of: $BF_4$, $PF_6$, $PO_4$, $AsF_6$, $SbF_6$, $SbCl_6$, $SO_4^{2-}$ $HSO_4$, alkyl-$SO_3$, perfluoroalkyl-$SO_3$, aryl-$SO_3$, $F^-$, $Cl^-$, $I_3^-$, $FeCl_4^-$, $Fe[(CN)_6]^{3-}$. If the thermal stability is dispensed with, $ClO_4^-$, $IO_4^-$ and $NO_3^-$, are also suitable. According to the invention, $BF_4^-$, $PF_6^-$, $CF_3SO_3^-$ and p-toluenesulfonate are preferred. Mixtures of the above-mentioned anions introduced into the polymer may also be present. The number of said anions based on the number of monomer units is for the most part 10 to 40%, preferably 15 to 30%.

The polymers according to the invention are prepared by oxidative polymerization, preferably by electrochemical (anodic) polymerization of the monomers.

The polymers according to the invention may be prepared, for example, by the action of electron acceptors on the monomers of the formula (I), optionally together with comonomers of the formulae (II) and (III). Suitable oxidizing agents which at the same time also serve as doping agents for the polymers, are, for example $I_2$, $AsF_5$, $SbCl_5$, $MoCl_5$, $FeCl_3$, $Fe(ClO_4)_3$, $Fe(BF_4)_3$, $Fe(CF_3SO_3)_3$, Fe(III) p-toluenesulfonate and $NO^+$ and $NO_2^+$ salts, such as $NOBF_4$, $NOPF_6$, $NOAsF_6$, $NOSbF_6$, $NOCF_3SO_3$, $NO_2BF_4$, $NO_2PF_6$ and aryldiazonium salts, such as, for example, benzenediazonium tetrafluoroborate.

The molar ratio of oxidizing agent to monomer is for the most part 2:1 to 5:1. If a solution is employed, the concentration of the oxidizing agent is, in general, between 0.1 and 1.5 mol per $dm^3$ of solvent.

To modify the properties of the conducting polymers produced, the presence of a further inert salt during the polymerization may be of advantage since the anions contained in said salt may be incorporated into the conducting polymer. Mention may be made here, for example, of tetrafluoroborates, hexafluorophosphates, hexafluoroarsenates, hexafluoroantimonates, hexachloroantimonates, hydrogen sulfates, perfluoroalkylsulfonates, p-toluenesulfonates and perchlorates. At the same time, tetrafluoroborates, hexafluorophosphates and trifluoromethanesulfonates are preferred. Mixtures of these salts may also be used. In addition to the alkaline-earth-metal cations and $H^+$, in particular, the alkali-metal cations, preferably $Li^+$ and $Na^+$ are suitable as cations for the salts. Cations of the type $R_4N^+$ or $R_4P^+$ wherein the radicals R in each case denote, independently of each other, hydrogen, $C_1$–$C_{12}$-alkyl radicals, cycloaliphatic or aromatic radicals are found to be particularly beneficial. The ratio of the anion equivalents added via the salt to the anion equivalents added via the oxidizing agent is 0.1 to 100.

The chemical polymerization may be carried out in the gas phase or in the liquid phase of the monomer and also in an emulsion or suspension. In most cases it is, however, advantageous to use an aprotic organic solvent for the monomer, such as, for example, acetonitrile, nitromethane, propylene carbonate, sulfolane, dichloromethane, chloroform, and tetrahydrofuran. It is not necessary, but of advantage, if the oxidizing agent is also soluble in the solvent.

A variant of the chemical polymerization process is to dissolve or suspend the oxidizing agent in a polymer matrix and to add the monomer via the gas phase. The polymerization then takes place on and in the polymer matrix. Most soluble, film-forming homo- and copolymers, such as, for example, polyvinyl acetate, polyvinyl alcohol, polymethyl methacrylate, and ethylene/vinyl acetate copolymers are suitable as matrix polymers. The content of oxidizing agent in the matrix polymers is usually 5 to 50% by weight.

The chemical polymerization is preferably carried out at room temperature. The temperature may, however, also be varied in a fairly large range which is limited in the downward direction by the solidification point and in the upward direction by the boiling point or decomposition point of one of the components and is for the most part in the range from −60° to 80° C., preferably −20° to 50° C. The greatest yields are, in general, achieved with a temperature of −10° to 40° C.

Particularly advantageous is the electrochemical preparation of the polymers according to the invention by anodic polymerization of the monomers of the formula (I), optionally together with comonomers of the formulae (II) or (III) in an electrolyte solvent in the presence of a conducting salt.

The anode is composed of one of the usual materials which are stable under the conditions of anodic polymerization, preferably of noble metals, in particular, platinum and gold, or carbon, in particular glassy carbon (pyrolytic carbon). The form of the anode has a considerable effect on the later configuration of the polymer produced while the latter is deposited like a skin on the surface of the anode. Suitable anodes for preparing flat polymer sheets are, for example, smooth metal sheets or plates which are preferably aligned parallel to the cathode. If two such anodes are used, they are situated at the same distance in front of and behind the cathode.

The cathode is composed of one of the usual electrode materials, such as, for example, platinum, gold, nickel, copper, silver, graphite or glassy carbon, preferably of stainless steel. It may be used in the form of plates, metal sheets or grids and is, in general, arranged parallel to the anode. If two cathodes are used, they are situated at the same distance in front of and behind the anode. In order to prevent a short circuit, the cathode may be separated from the anode by means of a spacer which is composed, for example, of an inert plastic grid.

In order to make the deposition of the electrically conducting polymers according to the invention on the anode possible in good yield, in contrast to the usual electrolysis conditions, there must be no vigorous stirring or vigorous flow. The otherwise diffusion-controlled mass transport of the monomers to the anode may be assisted by intermittent stirring of the electrolyte or by slow continuous or intermittent flow of the electrolyte or slow continuous or intermittent movement of the electrodes. The chosen velocity of flow of the electrolyte relative to the anode is, in general, less than 10 cm/s.

The electrochemical polymerization of the monomers or of the monomer mixtures is carried out in one of the usual electrolyte solvent systems which must be stable under the conditions of the electrochemical polymerization and have an adequate solubility for monomer and conducting salt. Preferably, use is made of dipolar aprotic solvents, such as, for example, acetonitrile, benzonitrile, propylene carbonate, nitromethane and sulfur dioxide, and also mixtures of these solvents, optionally also with other solvents which are stable under the conditions of the electrochemical polymerization, such as, for example, dimethylformamide, N-methylpyrrolidone, dimethyl sulfoxide, dichloromethane and tetrahydrofuran. An addition of less than five percent of a polar protic solvent, such as water, methanol or the acid on which the conducting salt is based may sometimes be of advantage.

As conducting salts which promote charge transport during the electrochemical polymerization and whose anions are incorporated in the polymers and may affect properties thereof, such as morphology, thermostability and electrical conductivity, use is made of the compounds which are usual per se. Mention may be made here, for example, of tetrafluoroborates, hexafluorophosphates, hexafluoroarsenates, hexafluoroantimonates, hexachloroantimonates, hydrogen sulfates, perfluoroalkylsulfonates, p-toluene sulfonates, and perchlorates. At the same time, tetrafluoroborates, hexafluorophosphates and trifluoromethanesulfonates are preferred. Mixtures of these conducting salts may also be used.

Suitable cations for the conducting salts are, in addition to the alkaline-earth-metal cations and $H^+$, in particular the alkali-metal cations, preferably $Li^+$ and $Na^+$. Cations of the type $R_4N^+$ or $R_4P^+$, wherein the radicals R in each case denote, independently of each other, hydrogen, $C_1$–$C_{12}$-alkyl radicals, cycloaliphatic or aromatic radicals, are found to be particularly beneficial. The quantity of conducting salt is, in general, between 0.01 and 1 mol, preferably 0.05 and 0.5 mol per $dm^3$ of solvent.

The concentration of monomer is 0.01 to 5 mol, preferably 0.05 to 1 mol of monomer per $dm^3$ of electrolyte solvent. In comonomer mixtures, the proportion of the monomers according to formula (I) is, in general, greater than 60 mol-%, preferably greater than 80 mol-% and, in particular, greater than 95 mol-%, based on the total quantity of monomers.

The electrochemical polymerization is preferably carried out at room temperature. The temperature may, however, also be varied in a rather large range which is limited in the downward direction by the solidification point and in the upward direction by the boiling point of the electrolyte solvent system and is, for the most part, in the range from −60° to 80° C., preferably −20° to 50° C. The greatest yields are achieved, in general, at a temperature of −10° to 40° C.

The electrolysis time depends on the electrolyte system used, the particular electrolysis conditions and, in particular, the quantity of monomers used. Usually, the electrolysis time is 1 to 12 hours, preferably 2 to 8 hours.

The electrochemical polymerization may be carried out in the usual cells or electrolysis apparatuses.

Simple electrolysis apparatuses, for example, comprising an undivided cell, two or more electrodes and an external current-voltage source are very suitable. However, divided cells with membranes or ion exchanger membranes or those with reference electrodes for determining the potential precisely may also be used. The measurement of the current consumption is expedient since this makes it possible to estimate the quantity of monomer already consumed. An electrolysis apparatus in which the cathode is flatly formed at the bottom and the anode is fed in the form of a strip with constant advance through the electrolyte or rotates in the form of a cylinder only partly immersed in the electrolyte makes it possible to conduct the process continuously.

A variant of the electrochemical polymerization is to choose a form of electrode which offers a large specific surface with many cavities, for example, grid-type, fabric-type and felt-type forms composed of noble-metal or carbon fibers, preferably of pyrolitic carbon. Suitable anodes are, for example, hard and soft felts and also singlelayer or multilayer carbon-fiber fabric. During the electrochemical polymerization, the polymer produced coalesces with the anode to form a composite body in which the conducting polymer has a larger surface than a corresponding quantity of the pure polymer in film form. The quantity of electrically conducting polymer which is incorporated in the composite body is preferably 5 to 50%.

Any direct current voltage source which supplies a sufficiently high electrical voltage is suitable as current-voltage source for operating the electrolysis cell in which the process according to the invention is carried out. Normally, the electrochemical polymerization is run with a voltage of 0.1 to 100 V, preferably in the range from 1.5 to 30 V. Values in the range from 0.001 to 100 mA/cm$^2$, preferably in the range from 0.01 to 10 mA/cm$^2$, of specific anode surface have been found to be beneficial and advantageous for the current density.

To isolate and purify the electrically conducting polymers, the crude products of the chemical or electrochemical polymerization are freed from conducting salts, monomers and adhering contaminates by washing with solvents, such as water, methanol, ethanol, acetonitrile or pentane. Yields of about 50 to 95% are possible using the process according to the invention.

The electrical conductivity of the polymers is 0.1 to 10000 S/cm, in particular, 1 to 1000 S/cm. The UV/VIS/NIR spectrum of the polymers shows an intensive absorption in the range from 400 to 3200 nm, in particular in the range from 500 to 1800 nm. The thermal stability of the polymers according to the invention is high. This is shown, for example, by the fact that a reduction of the weight by 10% occurs only at temperatures above 200° C.

The particular properties which distinguish the polymers according to the invention from the known conducting polymers make it possible to use them also for applications for which a high chemical, mechanical or thermal stability simultaneously accompanied by high electrical conductivity is necessary or of advantage. Mention may be made here of the preparation of catalysts, electrical switches, semiconductor components, solar cells, screening materials, camouflage paints, panel heating conductors, electrodes for reversible charge stores, electrodes for electrochemical synthesis and also of electrically conducting and antistatic foils and fibers.

The invention is explained in more detail by the examples below. Unless otherwise mentioned, the parts and percentages specified in the examples relate to the weight. The specific conductivity was determined by means of four-point measurement on moldings or "as grown" films. The thermal decomposition behavior was determined by differential thermogravimetry (DTG) and differential scanning calorimetry (DSC).

EXAMPLE 1

4.34 parts of tetraethylammonium tetrafluoroborate, 2.56 parts of 3-methoxy-4-methylthiophene and 200 parts of acetonitrile were introduced into an undivided electrolysis cell having a cooling jacket. The cathode comprised a V2A steel metal sheet 60 mm long and 55 mm wide. A platinum metal sheet 60 mm long and 55 mm wide was used as anode. At an electrolysis temperature of 20° C. and an anode current of 50 mA, a cell voltage of 3 to 6 V was obtained. After half the theoretical amount of current had been consumed, the electrolysis was stopped and the continuous polymer film deposited on the anode was separated mechanically from the anode, washed with acetonitrile and water, dried, digested with hexane and dried again. 1.02 parts of a film with a black gloss were obtained. The elementary analysis yielded the following values: 51.6% C, 4.3% H, 22.9% S, 4.0% F. The polymer film had a specific conductivity of 165 S/cm. In the DTG, a weight loss of less than 10% was observed up to 270° C. The DSC exhibited a maximum at 350° C.

EXAMPLE 2

4.34 parts of tetraethylammonium tetrafluoroborate, 3.45 parts of 3-butoxy-4-methylthiophene and 200 parts of acetonitrile were introduced into an undivided electrolysis cell having a cooling jacket. The cathode comprised a V2A steel metal sheet 60 mm long and 55 mm wide. A platinum metal sheet 60 mm long and 55 mm wide was used as anode. At an electrolysis temperature of 20° C. and an anode current of 50 mA, a cell voltage of 3 to 6 V was obtained. After half the theoretical amount of current had been consumed, the electrolysis was stopped and the extremely swollen polymer mass deposited on the anode was mechanically separated from the anode, washed with acetonitrile and water, dried, digested with hexane and dried again. 0.45 parts of a substance with a black gloss were obtained. A powder molding of the ground product had a specific conductivity of 0.06 S/cm. The elementary analysis yielded the following values: 53.3% C, 6.2% H, 15.5% S, 5.8% F. In the DTG, a weight loss of less than 10% was observed up to 270° C. The DSC exhibited a maximum at 350° C.

EXAMPLE 3

4.34 parts of tetraethylammonium tetrafluoroborate, 3.44 parts of 3-(methoxyethoxy)-4-methylthiophene and 200 parts of acetonitrile were introduced into an undivided electrolysis cell having a cooling jacket. The cathode comprised a V2A steel metal sheet 60 mm long and 55 mm wide. A platinum metal sheet 60 mm long and 55 mm wide was used as anode. At an electrolysis temperature of 20° C. and an anode current of 50 mA, a cell voltage of 3 to 6 V was obtained. After half the theoretical amount of current had been consumed, the electrolysis was stopped and the continuous polymer film deposited on the anode was separated mechanically from the anode, washed with acetonitrile and water, dried, digested with hexane and dried again. 0.52 parts of a film with a black gloss were obtained. The elementary analysis yielded the following values: 50.6% C, 5.3% H, 16.7% S, 6.6% F. The polymer film had a specific conductivity of 11 S/cm. In the DTG, a weight loss of less than 10% was observed up to 250° C. The DSC exhibited a maximum at 340° C.

EXAMPLE 4

4.34 parts of tetraethylammonium tetrafluoroborate, 2.82 parts of 3-dodecyloxy-4-methylthiophene and 200 parts of acetonitrile were introduced into an undivided electrolysis cell having a cooling jacket. The cathode comprised a V2A steel metal sheet 60 mm long and 55 mm wide. A platinum metal sheet 60 mm long and 55 mm wide was used as anode. The anode was mounted parallel to the cathode at a distance of 2 cm and separated by means of a spacer composed of polypropylene grid. At an electrolysis temperature of 20° C. and an anode current of 100 mA, a cell voltage of 3 to 6 V was obtained. After half the theoretical amount of current had been consumed, the electrolysis was stopped and the polymer mass deposited on the anode was separated mechanically. The crude product was comminuted mechanically, washed with acetonitrile and water, dried, digested with hexane, then filtered off and dried. 0.5 parts of a solid with a black gloss was obtained. The elementary analysis yielded the following values: 67.9% C, 9.5% H, 10.6% S, 0.9% F. A powder molding of the ground product had a specific conductivity of 0.5 S/cm. In the DTG, a weight loss of less than 10% was observed up to 310° C. The DSC exhibited a maximum at 350° C.

EXAMPLE 5

3.0 parts of $FeCl_3$ (anhydrous) were dissolved in 100 parts of acetonitrile. 1.0 parts of 3-methoxy-4-methylthiophene were added while stirring. After stirring for 6 h at room temperature, the suspension was introduced into 1000 parts of methanol. The insoluble polymer was separated off with the aid of a glass frit having the pore size G3, washed with acetonitrile and dried. 1.25 parts of a black powder were obtained. The elementary analysis yielded the following values: 44.6% C, 18.7% S, 3.8% H, 7.7% Fe and 12.3% Cl. A powder molding of the product had a specific conductivity of 0.04 S/cm.

EXAMPLE 6

4.34 parts of tetraethylammonium tetrafluoroborate, 2.56 parts of 3-methoxy-4-methylthiophene and 200 parts of acetonitrile were introduced into an undivided electrolysis cell having a cooling jacket. The cathode comprised a V2A steel metal sheet 60 mm long and 55 mm wide. A carbon felt (weight per unit area 0.4 kg/m², specific surface (BET) approx. 1.5 m²/g) 60 mm long, 55 mm wide and 4 mm thick was used as anode. At an electrolysis temperature of 20° C. and an anode current of 100 mA, a cell voltage of 3 to 6 V was obtained. After half the theoretical amount of current had been used, the electrolysis was stopped. The anode combined with the deposited polymer was washed with acetonitrile, pentane and water and dried. The composite body obtained was composed of 76 parts of carbon and 24 parts of the conducting polymer and had an electrical conductivity of approx. 1 S/cm. The thickness of the polymer coating on the carbon fibers was 1-2 μm.

We claim:

1. A self-supporting film or a self-supporting body consisting of an intrinsically electrically conducting polymer in the neutral (non-conducting) and oxidized (doped) form which is
    a) prepared electrochemically by anodic oxidation and
    b) composed of structural units which are joined to each other by linking in position 2 and/or position 5 and comprising, on the statistical average,
    60 to 100 mol-% of structural units which are derived from at least one monomer of the formula (I)

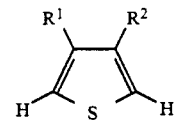

wherein $R^1$ represents $[-O(CH_2CH_2)_nCH_3] | O(CH_2CH_2O)_nCH_3$ where $n=1$ to 4 and
$R^2$ represents a $C_1-C_{12}$-alkyl group or
$R^1$ and $R^2$ together form the radical $-O(CH_2)_mCH_2$ where $m=1$ to 12, 0 to 40 mol-% of structural units which are derived from at least one monomer of the formula (II)

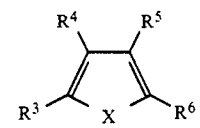

wherein $R^4$ and $R^5$ denote, independently of each other, a hydrogen atom, a halogen atom, a $C_1-C_{12}$-alkyl group, arylmethyl or aryl or form an aromatic ring together with the carbon atoms which join them, $R^3$ and $R^6$ denote, independently of each other, a hydrogen atom or $R^3$ together with $R^4$ and the carbon atoms which join them or $R^5$ together with $R^6$ and the carbon atoms which join them in each case form an aromatic ring, X denotes an oxygen atom, a sulfur atom, an NH group, an N-alkyl group or an N-aryl group, 0 to 40 mol-% of structural units which are derived from at least one monomer of the formula (III)

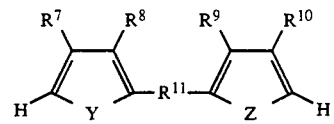

wherein $R^7$, $R^8$, $R^9$ and $R^{10}$ denote, independently of each other, a hydrogen atom, a $C_1-C_{12}$-alkyl group, an aryl group or a $C_1-C_{12}$-alkoxy group, Y and Z denote, independently of each other, an oxygen atom, a sulfur atom, an NH group, an N-alkyl group or N-aryl group, $R^{11}$ denotes an arylene group, a heteroarylene group or a conjugated system of the formula $(-CH=CH-)_p$, wherein p is zero, 1, 2 or 3.

2. The self-supporting film or self-supporting body as claimed in claim 1, which is composed, on the statistical average of 95 to 100 mol-% of structural units which are derived from a monomer of the formula (I).

3. A self-supporting film or a self-supporting body as claimed in claim 1, wherein n is 1 and m is 1 or 2.

4. A self-supporting film or a self-supporting body consisting of an intrinsically electrically conducting polymer in the oxidized (doped) form having structural units which are joined to each other by linking in position 2 and/or position 5, and comprising structural units which are derived from at least one monomer of the formula (I)

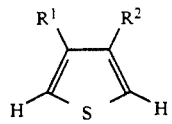
(I)

wherein
$R^1$ represents $[-O(CH_2CH_2)_nCH_3]\text{-}O(CH_2CH_2O)_nCH_3$ where $n = 1$ to 4 and
$R^2$ represents a $C_1\text{-}C_{12}$-alkyl group or
$R^1$ and $R^2$ together form the radical $-O(CH_2)_mCH_2$ where $m = 1$ to 12.

5. A self-supporting film or a self-supporting body as claimed in claim 4, wherein n is 1 and m is 1 or 2.

6. A self-supporting film or a self-supporting body as claimed in claim 1, wherein there is 90 to 100 mole % of formula I.

7. A self-supporting film or a self-supporting body as claimed in claim 6, wherein there is 95 to 100 mole % of formula I.

8. An intrinsically electrically conducting polymer in the neutral (non-conducing) and oxidized (doped) form comprised of structural units which are joined to each other by linking in position 2 and/or position 5 and comprising, on the statistical average,
60 to 100 mol-% of structural units which are derived from at least one monomer of the formula (I)

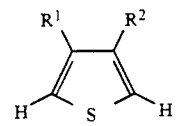
(I)

wherein
$R^1$ represents $-O(CH_2CH_2O)_nCH_3$ where $n = 1$ to 4 and
$R^2$ represents a $C_1\text{-}C_{12}$-alkyl group or
$R^1$ and $R^2$ together form the radical $-O(CH_2)_mCH_2$ where $m = 1$ to 12,
0 to 40 mol-% of structural units which are derived from at least one monomer of the formula (II)

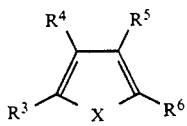
(II)

wherein
$R^4$ and $R^5$ denote, independently of each other, a hydrogen atom, a halogen atom, a $C_1\text{-}C_{12}$-alkyl group, arylmethyl or aryl or form an aromatic ring together with the carbon atoms which join them,
$R^3$ and $R^6$ denote, independently of each other, a hydrogen atom or $R^3$ together with $R^4$ and the carbon atoms which join them or $R^5$ together with $R^6$ and the carbon atoms which join them in each case form an aromatic ring,
X denotes an oxygen atom, a sulfur atom, an NH group, an N-alkyl group or an N-aryl group,
0 to 40 mol-% of structural units which are derived from at least one monomer of the formula (III)

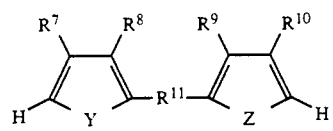
(III)

wherein
$R^7$, $R^8$, $R^9$ and $R^{10}$ denote, independently of each other, a hydrogen atom, a $C_1\text{-}C_{12}$-alkyl group, an aryl group or a $C_1\text{-}C_{12}$-alkoxy group,
Y and Z denote, independently of each other, an oxygen atom, a sulfur atom, an NH group, an N-alkyl group or N-aryl group,
$R^{11}$ denotes an arylene group, a heteroarylene group or a conjugated system of the formula $(-CH=CH-)_p$, wherein p is zero, 1, 2 or 3.

* * * * *